(12) United States Patent
Wang et al.

(10) Patent No.: US 11,619,488 B2
(45) Date of Patent: Apr. 4, 2023

(54) OPTICAL VOLUME MEASUREMENT DEVICE

(71) Applicant: CHAMPTEK INCORPORATED, New Taipei (TW)

(72) Inventors: Kuo-Chun Wang, New Taipei (TW); Shu-Ying Huang, New Taipei (TW); Tai-Wei Chen, New Taipei (TW)

(73) Assignee: CHAMPTEK INCORPORATED, New Taipei (TW)

( * ) Notice: Subject to any disclaimer, the term of this patent is extended or adjusted under 35 U.S.C. 154(b) by 84 days.

(21) Appl. No.: 17/081,772

(22) Filed: Oct. 27, 2020

(65) Prior Publication Data
US 2021/0123732 A1    Apr. 29, 2021

(30) Foreign Application Priority Data

Oct. 28, 2019 (TW) ................................ 108138836

(51) Int. Cl.
*H04N 5/225* (2006.01)
*G01C 3/00* (2006.01)
(Continued)

(52) U.S. Cl.
CPC ............... *G01C 3/00* (2013.01); *H04N 23/55* (2023.01); *H04M 1/0266* (2013.01)

(58) Field of Classification Search
CPC ................................ G01C 3/00; H04N 5/2254
See application file for complete search history.

(56) References Cited

U.S. PATENT DOCUMENTS 9,798,912 B1 * 10/2017 Brock .................... H04N 25/44
2001/0007346 A1 * 7/2001 Yamakawa .......... H04N 1/0402
250/208.1
(Continued)

FOREIGN PATENT DOCUMENTS

CN  104705274 A  6/2015
CN  106767399 A  5/2017
(Continued)

OTHER PUBLICATIONS

Search Report dated Feb. 2, 2021 of the corresponding European patent application No. 20204143.0.
(Continued)

*Primary Examiner* — Zaihan Jiang
(74) *Attorney, Agent, or Firm* — Chun-Ming Shih; HDLS IPR Services

(57) ABSTRACT

An optical volume measurement device includes a main body, a pair of photographic lenses, an optical distance measuring unit and an optical projecting unit. The photographic lenses are disposed on the main body. Each of the photographic lenses has an image acquiring area extended forwardly therefrom and captures images within the image acquiring area separately, and a resolution distance range is formed in front of each photographic lens. Each photographic lens identifies the image within the resolution distance range, and image acquiring areas are overlapped to form a measurement area within the resolution distance range. The optical projecting unit is disposed on the main body and forwardly project an optical alignment indicator in a projection area. The projection area is located in the measurement area within the resolution distance range.

6 Claims, 6 Drawing Sheets

(51) Int. Cl.
*H04N 23/55* (2023.01)
*H04M 1/02* (2006.01)

(56) References Cited

U.S. PATENT DOCUMENTS

| | | | | |
|---|---|---|---|---|
| 2002/0071038 | A1* | 6/2002 | Mihelcic | G01B 11/2518 |
| | | | | 348/207.99 |
| 2010/0134598 | A1* | 6/2010 | St-Pierre | G01B 11/2513 |
| | | | | 348/47 |
| 2011/0160083 | A1* | 6/2011 | Hell | G02B 21/16 |
| | | | | 506/9 |
| 2013/0280828 | A1* | 10/2013 | Ainspan | G01J 11/00 |
| | | | | 257/E21.53 |
| 2014/0267286 | A1* | 9/2014 | Duparre | G09G 3/002 |
| | | | | 345/428 |
| 2015/0285746 | A1* | 10/2015 | Suematsu | H01J 37/20 |
| | | | | 348/86 |
| 2016/0150227 | A1* | 5/2016 | Ainspan | H04N 17/002 |
| | | | | 348/188 |
| 2019/0166348 | A1* | 5/2019 | Kempf | H04N 13/204 |
| 2019/0327404 | A1* | 10/2019 | Yata | H04N 23/72 |
| 2019/0371071 | A1* | 12/2019 | Lyons | G06T 7/246 |
| 2020/0020024 | A1* | 1/2020 | Lyons | G06F 3/011 |

FOREIGN PATENT DOCUMENTS

| | | | | |
|---|---|---|---|---|
| CN | 206891382 | U | | 1/2018 |
| CN | 109443196 | A | | 3/2019 |
| CN | 110007107 | A | * | 4/2019 |
| CN | 110007107 | A | * | 4/2019 |
| CN | 110007107 | A | * | 7/2019 ............... G01P 3/38 |
| EP | 1205790 | | * | 11/2001 |
| EP | 3106829 | A1 | | 12/2016 |
| TW | 201013554 | A | | 4/2010 |
| TW | 201043929 | A | | 12/2010 |
| TW | M592072 | M | | 3/2020 |
| UA | WO2014025559 | | * | 7/2013 |
| WO | WO2014025559 | | * | 2/2014 |

OTHER PUBLICATIONS

Office Action dated Jul. 24, 2020 of the corresponding Taiwan patent application No. 108138836.
Office Action dated Mar. 3, 2022 of the corresponding China patent application No. 202010969042.1.

* cited by examiner

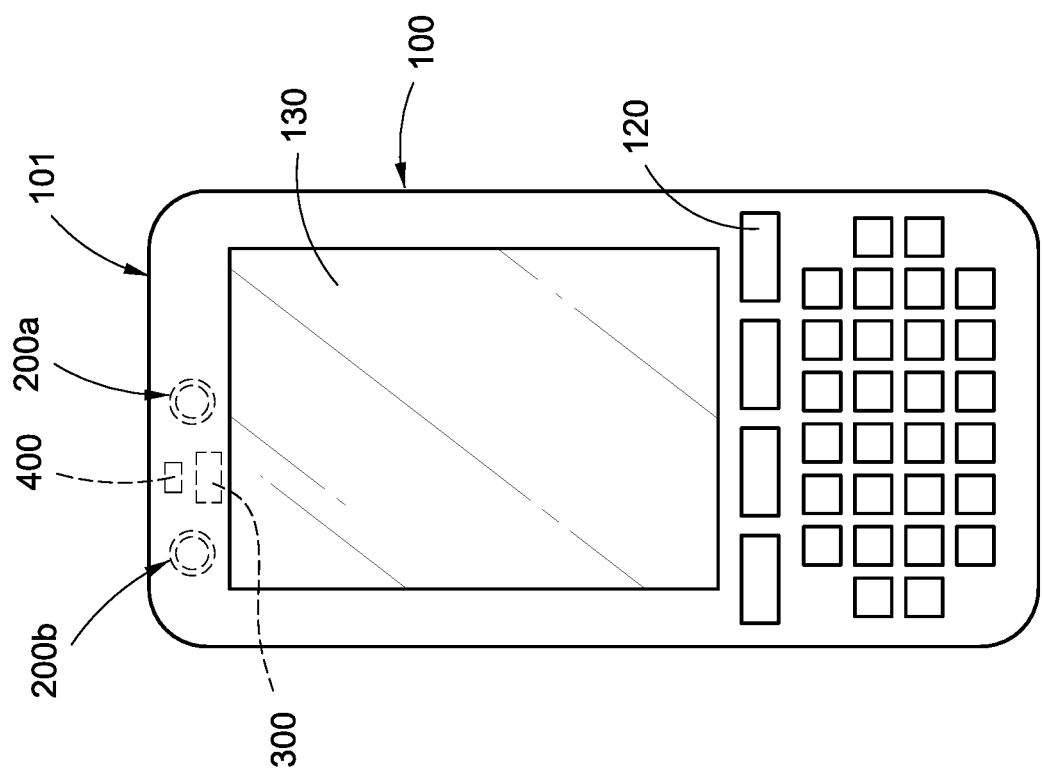

OPTICAL VOLUME MEASUREMENT DEVICE

BACKGROUND OF THE INVENTION

Technical Field

The technical field relates to a volume measurement device, and more particularly relates to an optical volume measurement device capable of projecting an optical alignment indicator.

Description of Related Art

Existing volume measurement devices generally use multiple lenses to acquire images of the object and then calculate the volume thereof. However, the working range of the lens is not visible, so it is difficult for users to place the object within the working range of the lens. Generally, users need to place the object in front of the lenses at the position of guessed working range, and then the volume measuring device is operated to test whether the volume of the object can be measured. When the volume of the object cannot be measured, then the relative position of the volume measuring device and the object is adjusted before re-measuring. Therefore, the relative position of the volume measuring device and the object is determined by users' guessing of the working range of the lens without specific and objective guidance, and that is inconvenient for users.

In view of the above drawbacks, the inventor proposes this disclosure based on his expert knowledge and elaborate researches in order to solve the problems of prior art.

SUMMARY OF THE INVENTION

This disclosure provides an optical volume measurement device capable of projecting an optical alignment indicator.

This disclosure provides an optical volume measurement device including a main body, a pair of photographic lenses, an optical distance measuring unit and an optical projecting unit. The main body has a working surface. The photographic lenses are disposed on the working surface. Each of the photographic lenses has an image acquiring area extended forwardly therefrom and captures images within the image acquiring area separately, wherein an resolution distance range is located in front of each photographic lens, and each photographic lens identifies images within the resolution distance range, and image acquiring areas of the pair of photographic lenses are partially overlapped to form a measurement area within the resolution distance range. The optical distance measuring unit is disposed on the working surface. The optical projecting unit is disposed on the working surface and forwardly projects an optical alignment indicator in a projection area, wherein the projection area is located in the measurement area within the resolution distance range.

In the optical volume measurement device of this disclosure, the main body has a handle for holding. The main body has a switch to drive the optical projecting unit. The main body is in a form of a mobile phone. The working surface is located on one side of the main body, and another side of the main body is provided with a display.

In the optical volume measurement device of this disclosure, at least part of the optical alignment indicator is located at a boundary of the measurement area. The optical alignment indicator is arranged along two different intersecting sides of the measurement area and across the measurement area.

In the optical volume measurement device of this disclosure, each image acquiring area is a cone-shaped space that expands and extends forwardly from each photographic lens. The projection area is a cone-shaped space that expands and extends forwardly from the optical projecting unit.

In the optical volume measurement device of this disclosure, the optical distance measuring unit is arranged between the pair of photographic lenses to directly face the measurement area. The optical projecting unit is arranged between the pair of photographic lenses so that the projection area and the measurement area may be overlapped as much as possible.

In the optical volume measurement device of this disclosure, the optical alignment indicator may visually indicate the position of the measurement area. Users may position the object in the measurement area by aligning the optical alignment indicator with the object.

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

FIG. 6 is an illustration of another embodiment of the main body of the optical volume measurement device in accordance of an embodiment of this disclosure.

DETAILED DESCRIPTION OF THE PREFERRED EMBODIMENTS

Figure 1:
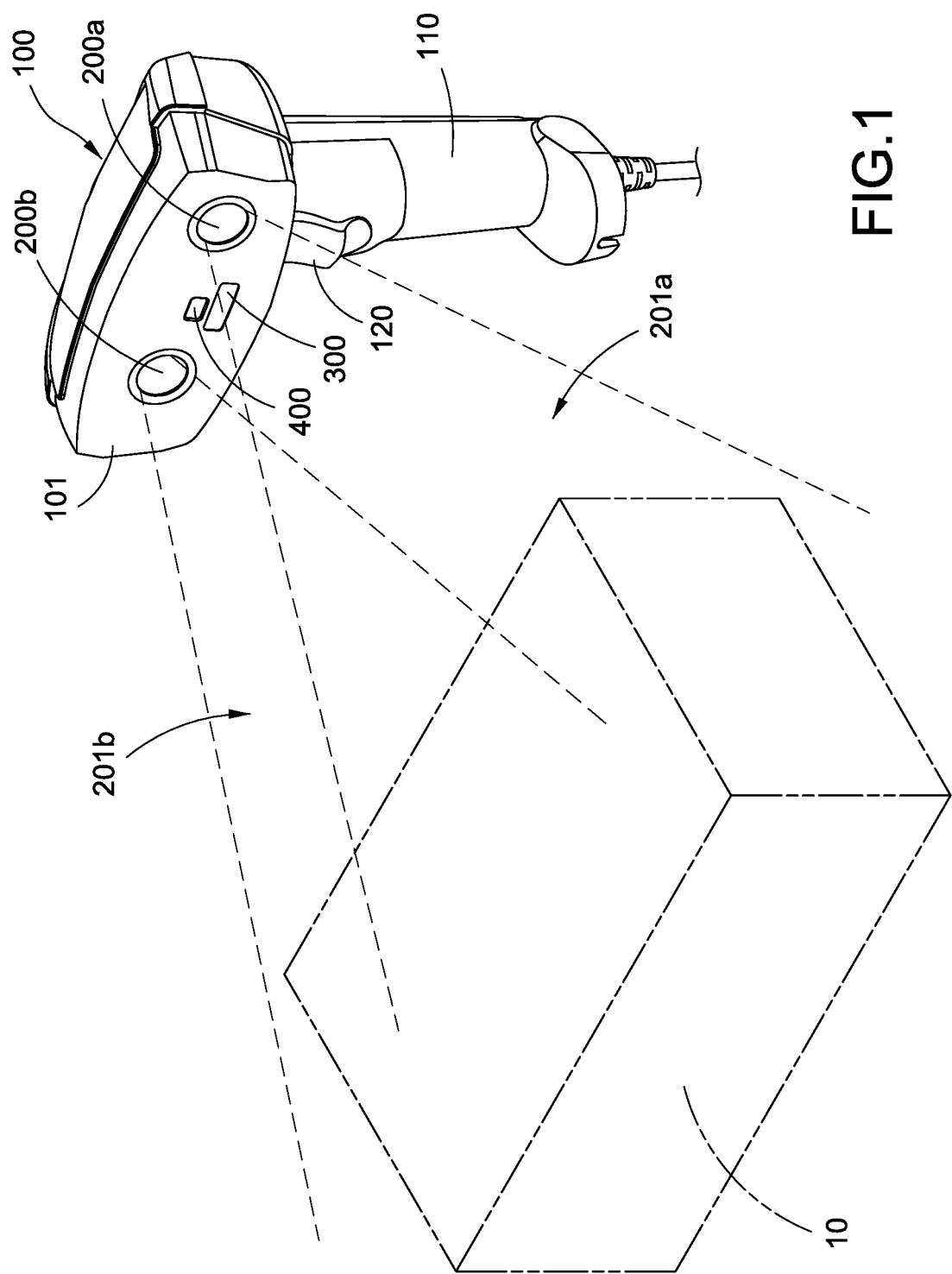
FIG. 1 and FIG. 2 are illustrations of using the optical volume measurement device in accordance of an embodiment of this disclosure.
Figure 2:
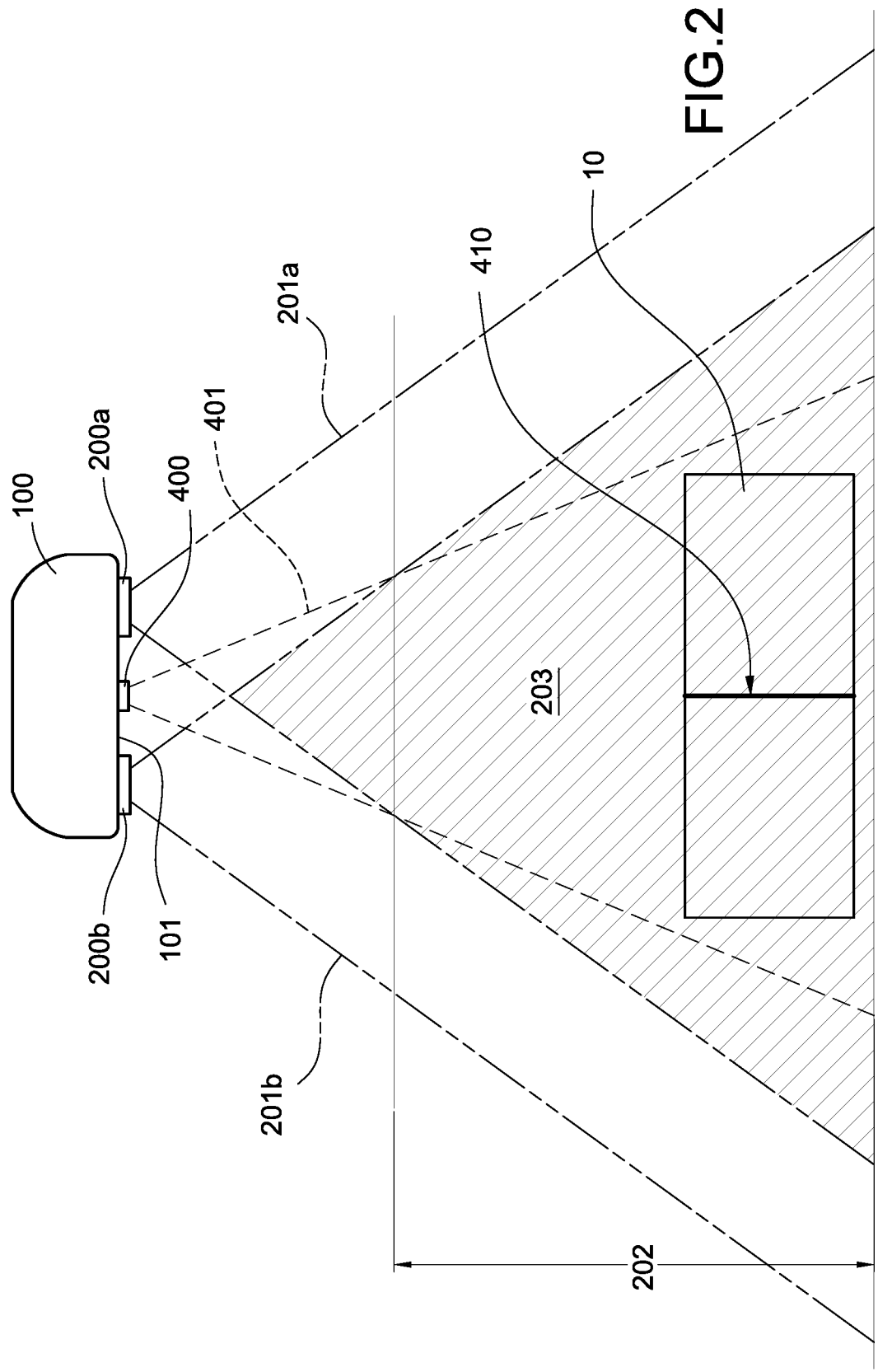
Figure 3:
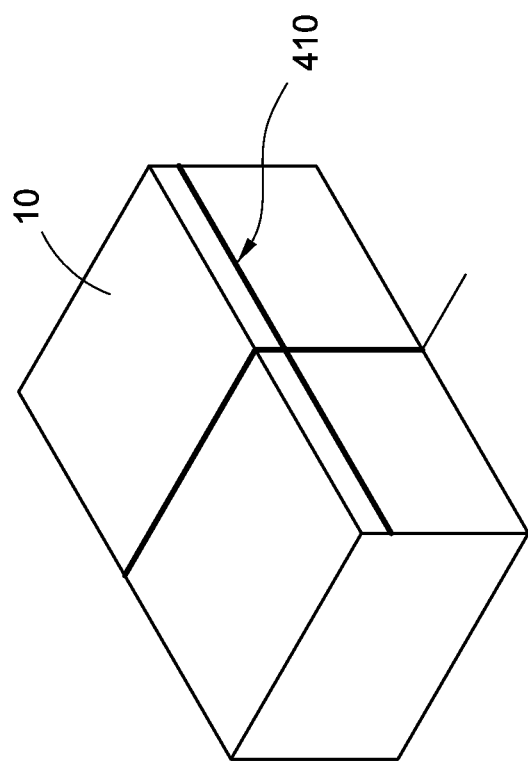
FIG. 3 and FIG. 4 are illustrations of the optical volume measurement device projecting an optical alignment indicator on the object in accordance of an embodiment of this disclosure.
Figure 4:
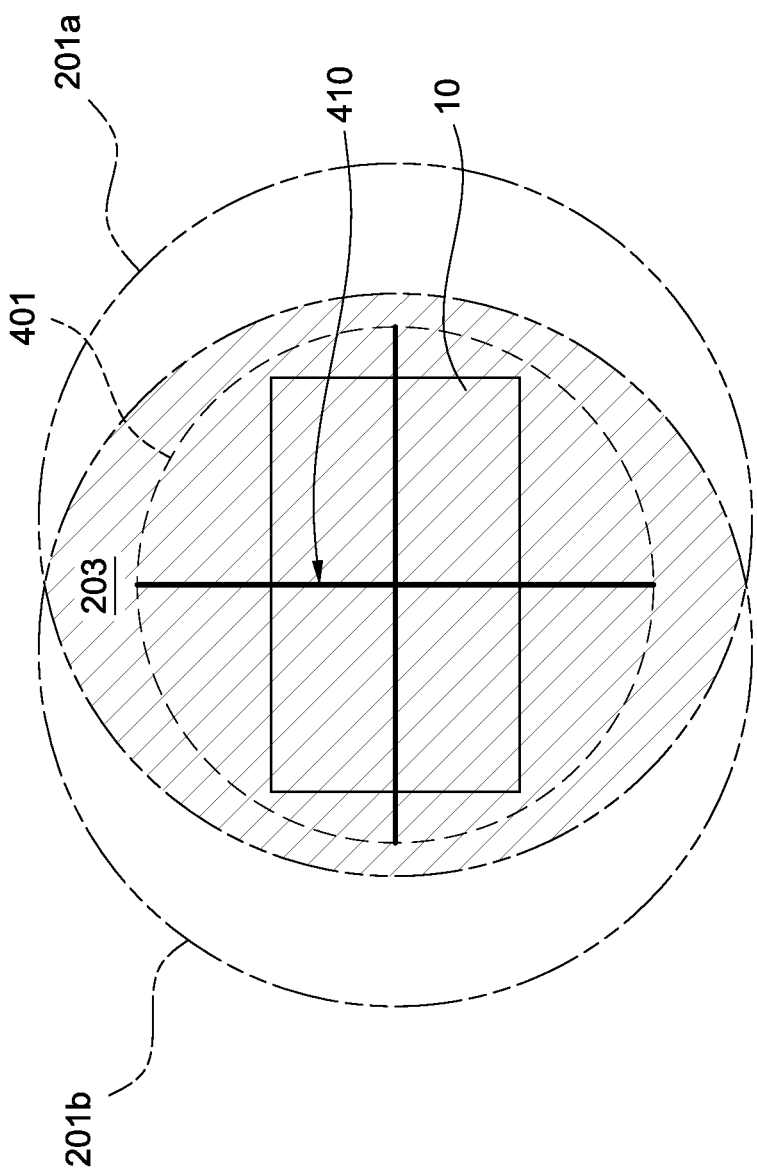

In cooperation with attached drawings, the technical contents and detailed description of the invention are described thereinafter according to a number of preferable embodiments, being not used to limit its executing scope. Any equivalent variation and modification made according to appended claims is all covered by the claims claimed by this disclosure.

Please refer to FIG. 1 to FIG. 4, an embodiment of this disclosure provides an optical volume measurement device including a main body 100, a pair of photographic lenses 200a, 200b, an optical distance measuring unit (such as an optical range finder) 300 and an optical projecting unit (such as an optical projector) 400.

A working surface 101 is defined (or formed) on the outer surface of the maim body 100. The working surface 101 is preferably a plane, but this disclosure is not limited thereto. The working surface 101 may be composed of multiple sub planes such that normal directions thereof are parallel to each other. The working surface 101 may also be a curved surface. The working surface 101 may also be composed of multiple sub planes such that the normal directions thereof have slight or certain inclined angles therebetween. Therefore, the working surface 101 may render the photographic lenses 200a, 200b, the optical distance measuring unit 300 and the optical projecting unit 400 to be arranged thereon and substantially face the same direction. In the present embodiment, the photographic lenses 200a, 200b, the optical distance measuring unit 300 and the optical projecting unit 400 are arranged in the same direction. Each of the photographic lenses 200a, 200b may be slightly rotated toward the other photographic lens 200a, 200b.

The photographic lenses 200a, 200b are disposed on the working surface 101. Each of the photographic lenses 200a, 200b has an image acquiring area 201a, 201b extended forwardly, which refers to a view field range of each photographic lens 200a, 200b. Generally, each image acquiring area 201a, 201b is a cone-shaped space that expands and extends forwardly from each of the photographic lenses 200a, 200b. Therefore, each of the photographic lenses 200a, 200b may capture images within the image acquiring area 201a, 201b separately. Each photographic lens 200a, 200b has a resolution distance range 202 in the front, and the resolution distance range 202 refers to the range between the closest and the farthest distances that each photographic lens 200a, 200b can focus and resolve. Thus, each photographic lens 200a, 200b may recognize the image of the object 10 at a distance within the resolution distance range 202. In addition, the pair of the image acquiring areas 201a, 201b (of the pair of photographic lenses 200a, 200b) are partially overlapped to form a measurement area 203 within the resolution distance range 202.

The optical distance measuring unit 300 is disposed on the working surface 101. In general, the optical distance measuring unit 300 includes a light emitting element and a light receiving element. After the light emitted from the light emitting element is reflected by the object 10, the reflected light is received by the light receiving element and the distance between the optical distance measuring unit 300 and the object 10 is measured by comparing the difference between the emitted light and the reflected light. Thereby, the distance between the optical distance measuring unit 300 and the object 10 located in the measurement area 203 may be measured by the optical distance measuring unit 300.

Based on the images including the object 10 located in the measurement area 203 captured by the pair of photographic lenses 200a, 200b separately, the image recognition of the images captured by each photographic lens 200a, 200b is performed to obtain two-dimensional coordinates of several endpoints on the object 10 in the two images. The two-dimensional coordinates are converted into three-dimensional coordinates according to the distance measured by the optical distance measuring unit 300. The length, width and depth of the object 10 may be further calculated based on the three-dimensional coordinates to calculate its volume.

The optical distance measuring unit 300 is preferably arranged between the pair of photographic lenses 200a, 200b to directly face the object 10 in the measurement area 203 for accurately measuring the distance between the optical distance measuring unit 300 and the object 10 located in the measurement area 203.

The optical projecting unit 400 is disposed on the working surface 101. The optical projecting unit 400 may forwardly project a visible light in a projection area 401, and the visible light is arranged to be capable of projecting and displaying an optical alignment indicator 410. Generally speaking, the projection area 401 is a cone-shaped space that expands and extends forwardly from the optical projecting unit 400, and the projection area 401 is located in the measurement area 203 within the resolution distance range 202. When the object 10 is placed in the measurement area 203, the object 10 blocks the visible light projected by the optical projecting unit 400 such that the visible light projects and displays the optical alignment indicator 410 on the object 10. The optical projecting unit 400 is preferably arranged between the pair of photographic lenses 200a, 200b so that the projection area 401 and the measurement area 203 may be overlapped as much as possible.

At least part of the optical alignment indicator 410 is located at a boundary of the measurement area 203. The optical alignment indicator 410 is arranged along two different intersecting sides of the measurement area 203 and across the measurement area 203. Therefore, users may position the object 10 within the measurement area 203 by aligning the optical alignment indicator 410 with the object 10. Specifically, when the optical alignment indicator 410 is projected on the surface of the object 10 and extends to the boundary thereof, users know that the object 10 does not exceed the projection range of the optical alignment indicator 410. That is, the object 10 is located within the measurement area 203 for measurement.

Figure 5:
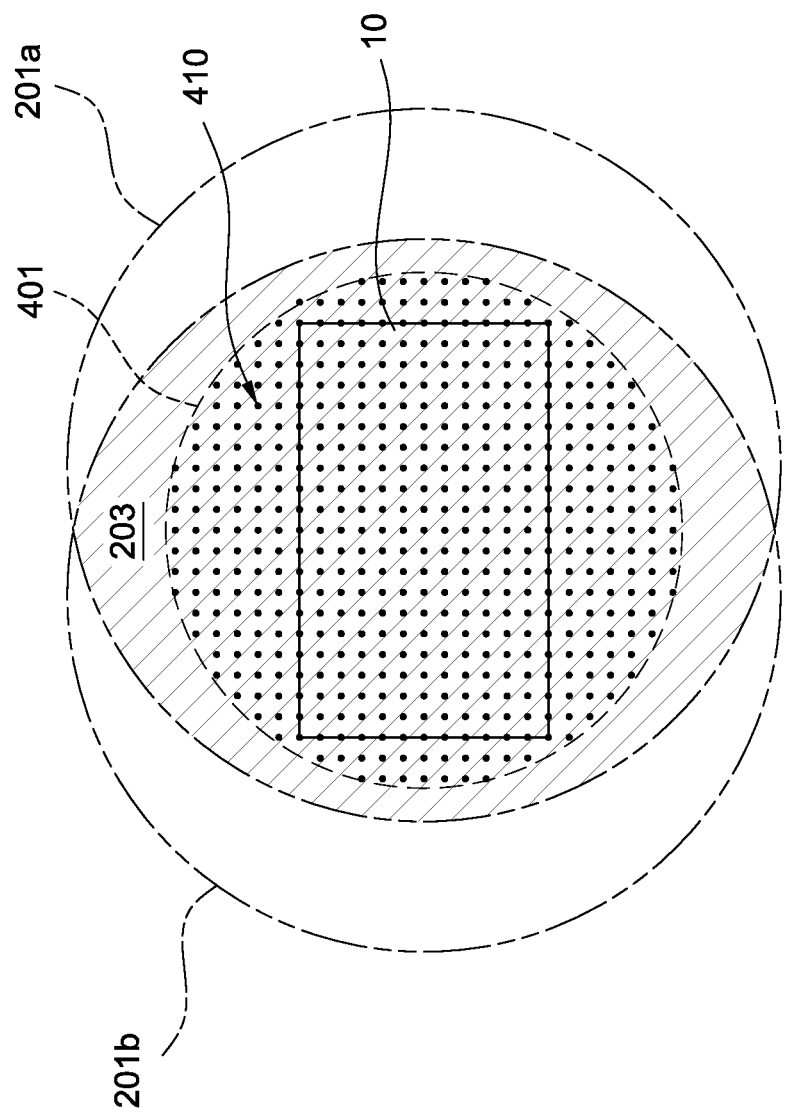
FIG. 5 is an illustration of another embodiment of the optical alignment indicator of this disclosure.

In the present embodiment, the alignment indicator 410 may be a pair of intersecting straight lines, and it is, preferably, a horizontal line and a vertical line that perpendicularly cross the center of the measurement area 203. The optical alignment indicator 410 may also be dots distributed in the measurement area 203 as shown in FIG. 5, and at least a part of the dots are arranged along two different intersecting sides of the measurement area 203 and located in the measurement area 203 separately, but two ends of each column (or row) of dots do not exceed the measurement area 203.

The main body 100 may be presented in different types according to different needs, and the form of the main body 100 is not limited to this disclosure. Moreover, as shown in FIG. 1, the main body 100 may optionally be provided with a handle 110 for users to hold. As shown in FIG. 1 and FIG. 6, the main body 100 may optionally be provided with a switch 120 to drive the optical projecting unit 400. Please refer to FIG. 6, the main body 100 may optionally be provided with a display 130 to show the images captured by the pair of photographic lenses 200a, 200b and the calculated volume thereof. In the following description, several possible specific configurations are listed based on the preceding features, but this disclosure is not limited thereto.

For example, as shown in FIG. 1, the main body 100 may be a general gun-type barcode scanner having a handle 110 for users to hold. A switch 120 is provided on one side of the handle 110 to drive the optical projecting unit 400, and the working surface 101 is formed on one side of the top end of the handle 110. Another side of the top end of the handle 110 may optionally be provided with a display 130 to show the images captured by the pair of photographic lenses 200a, 200b.

For another example, the main body 100 may also be in a form of a mobile phone shown in FIG. 6. The working surface 101 is formed on one side of the main body 100, and another side of the main body 100 is provided with a display 130 to show the images captured by the pair of photographic lenses 200a, 200b. Moreover, a switch 120 may be optionally provided on the main body 100 to drive the optical projecting unit 400 based on the needs.

Although this disclosure has been described with reference to the embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. An optical volume measurement device, comprising:
   a main body, comprising a working surface;
   a pair of photographic lenses, disposed on the working surface, each of the photographic lenses comprising an image acquiring area extended forwardly therefrom and capturing images within the image acquiring area separately, wherein an resolution distance range is located in front of each photographic lens, and each photographic lens identifies images within the resolution distance range, and the pair of image acquiring areas are partially overlapped to form a measurement area within the resolution distance range;
   an optical distance measuring unit, disposed on the working surface; and
   an optical projecting unit, disposed on the working surface and forwardly projecting an optical alignment indicator in a projection area;
   wherein the projection area is located in the measurement area within the resolution distance range;
   wherein at least a part of the optical alignment indicator is located at a boundary of the measurement area;
   wherein the optical alignment indicator is arranged along two different intersecting sides of the measurement area and across the measurement area;
   wherein the main body comprises a handle, the working surface is formed on one side of one end of the handle, and the optical projecting unit is arranged between the pair of photographic lenses.

2. The optical volume measurement device according to claim 1, wherein the main body comprises a switch to drive the optical projecting unit.

3. The optical volume measurement device according to claim 1, wherein each image acquiring area is a cone-shaped space that expands and extends forwardly from each photographic lens.

4. The optical volume measurement device according to claim 1, wherein the projection area is a cone-shaped space that expands and extends forwardly from the optical projecting unit.

5. The optical volume measurement device according to claim 1, wherein the optical distance measuring unit is arranged between the pair of photographic lenses.

6. The optical volume measurement device according to claim 1, wherein the optical projecting unit is arranged between the pair of photographic lenses.

* * * * *